United States Patent
Nakahara et al.

(10) Patent No.: US 9,327,358 B2
(45) Date of Patent: May 3, 2016

(54) METHOD FOR PROCESSING GEAR AND CUTTER FOR PROCESSING GEAR

(71) Applicant: AISIN SEIKI KABUSHIKI KAISHA, Kariya-shi (JP)

(72) Inventors: Yoshitomo Nakahara, Kariya (JP); Nobuaki Kurita, Yatomi (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 139 days.

(21) Appl. No.: 14/133,829

(22) Filed: Dec. 19, 2013

(65) Prior Publication Data

US 2014/0234043 A1    Aug. 21, 2014

(30) Foreign Application Priority Data

Feb. 15, 2013  (JP) .................. 2013-028359

(51) Int. Cl.
  *B23F 9/06*   (2006.01)
  *B23F 21/16*  (2006.01)
  (Continued)

(52) U.S. Cl.
  CPC ............. *B23F 21/16* (2013.01); *B23F 5/163* (2013.01); *B23F 5/20* (2013.01); *B23F 5/22* (2013.01); *B23F 9/06* (2013.01); *B23F 21/10* (2013.01); *Y10T 407/1715* (2015.01); *Y10T 409/10159* (2015.01); *Y10T 409/10477* (2015.01); *Y10T 409/10795* (2015.01);
  (Continued)

(58) Field of Classification Search
  CPC ............. Y10T 409/10159; Y10T 409/101749; Y10T 409/101908; Y10T 409/103816; Y10T 409/10477; Y10T 409/104929; Y10T 409/105247; Y10T 409/105406; Y10T 409/105565; Y10T 409/105724; Y10T 409/107791; Y10T 409/10795; Y10T 409/108904; B23F 9/06; B23F 9/04; B23F 9/14; B23F 1/04; B23F 5/14; B23F 21/10; B23F 21/06
  See application file for complete search history.

(56) References Cited

U.S. PATENT DOCUMENTS 676,226 A * 6/1901 Fellows .................... 407/28
1,429,398 A * 9/1922 Barth ....................... 409/47
(Continued)

FOREIGN PATENT DOCUMENTS

DE  10 2007 051 375 A1  1/2009
EP     2 422 920 A2     2/2012
(Continued)

OTHER PUBLICATIONS

German Search Report issued Sep. 8, 2014 in German Patent Application No. 10 2014 201 110.8 (with English Translation of Category of Cited Documents).

*Primary Examiner* — Sunil K Singh
*Assistant Examiner* — Yasir Diab
(74) *Attorney, Agent, or Firm* — Oblon, McClelland, Maier & Neustadt, L.L.P.

(57) ABSTRACT

A method for processing a gear includes a first cutting process starting the cutting of a work by moving a cutter in a first cutting direction while maintaining a cutting depth of the work at a setting value and reducing the cutting depth of the work before a first cutter portion reaches an end portion of a cutting area in the first cutting direction and a second cutting process synchronously rotating the work and the cutter in a reverse direction of rotational directions of the work and the cutter in the first cutting process, maintaining the cutting depth of the work at the setting value, and cutting the end portion of the cutting area by moving the cutter in a second cutting direction.

12 Claims, 10 Drawing Sheets

(51) Int. Cl.
  B23F 5/20 (2006.01)
  B23F 5/16 (2006.01)
  B23F 5/22 (2006.01)
  B23F 21/10 (2006.01)

(52) U.S. Cl.
  CPC ............... *Y10T 409/101749* (2015.01); *Y10T 409/103816* (2015.01); *Y10T 409/107791* (2015.01)

(56) References Cited

U.S. PATENT DOCUMENTS

| | | | | |
|---|---|---|---|---|
| 2,126,178 | A * | 8/1938 | Drummond | 407/27 |
| 3,570,367 | A * | 3/1971 | Looman et al. | 409/34 |
| 3,739,686 | A * | 6/1973 | Marano | 409/32 |
| 4,066,001 | A * | 1/1978 | Nishijima et al. | 409/37 |
| 4,215,959 | A * | 8/1980 | Deprez | 409/10 |
| 4,955,768 | A * | 9/1990 | Crankshaw | 409/10 |
| 6,227,775 | B1 * | 5/2001 | Klammer | 409/26 |
| 7,310,863 | B2 * | 12/2007 | Lee et al. | 29/56.5 |
| 2004/0042858 | A1 * | 3/2004 | Sheffler | 407/11 |
| 2011/0268523 | A1 * | 11/2011 | Heinemann et al. | 409/12 |
| 2012/0057944 | A1 * | 3/2012 | Nagata | 409/48 |
| 2012/0177457 | A1 | 7/2012 | Nagata | |
| 2012/0282055 | A1 | 11/2012 | Marx et al. | |

FOREIGN PATENT DOCUMENTS

| | | |
|---|---|---|
| JP | 2006-224228 | 8/2006 |
| JP | 2012-143821 | 8/2012 |
| JP | 2012-171020 | 9/2012 |
| JP | 3181136 U | 1/2013 |
| WO | 2012/175408 A1 | 12/2012 |

* cited by examiner

METHOD FOR PROCESSING GEAR AND CUTTER FOR PROCESSING GEAR

CROSS REFERENCE TO RELATED APPLICATIONS

This application is based on and claims priority under 35 U.S.C. §119 to Japanese Patent Application 2013-028359, filed on Feb. 15, 2013, the entire content of which is incorporated herein by reference.

TECHNICAL FIELD

This disclosure generally relates to a method for processing a gear and a cutter for processing a gear.

BACKGROUND DISCUSSION

A known method for suppressing the occurrence of burrs when a gear processing is operated by cutting a work using a cutter with a skiving technology is disclosed in JP2012-143821A (hereinafter referred to as Patent reference 1). According to Patent reference 1, a technology for applying a brittleness to a processing surface of the work by performing a surface hardening treatment on the processing surface of the work so that cutting chips generated by cutting the work by the cutter tend to be readily removed from the work is disclosed.

Another known technology is disclosed in JP2012-171020A (hereinafter referred to as Patent reference 2). According to Patent reference 2, the technology for differentiating at least one of cutting conditions, a feed rate of a cutter for cutting a work, a cutting amount to the work and a relative rotation position of the cutter and the work, between a downstream end surface of the work and other areas than the downstream end surface of the work in a feeding direction of the cutter is disclosed.

According to a second embodiment of Patent reference 2, after the cutter cutting the work reaches the bottom surface of the work, the cutter operates a reciprocating movement along the feeding direction at a small area. Burrs are removed by the cutter coming in contact with the work.

According to Patent reference 1 and Patent reference 2, when the cutting process is operated on the work using the cutter with the skiving technology, the burrs are formed at an end portion of a tooth groove of the work. The burrs generated can be removed by the technologies disclosed in Patent reference 1 and Patent reference 2.

However, according to the technology disclosed in Patent reference 1, an extra process required for surface treatment of the work is a disadvantage in terms of a manufacturing cost. According to Patent reference 2, the technology does not prevent the burrs from being formed in the first place. Thus, the burrs may still be remained on the work.

Further, a chamfering process may be operated on an end surface of a work to remove burrs formed on the work after a cutting process. However, an extra process other than the cutting process to form a gear is required.

A need thus exists for a method for processing a gear and a cutter for processing a gear which is not susceptible to the drawback mentioned above.

SUMMARY

According to an aspect of this disclosure, a method for processing a gear includes processes of arranging a work rotatably supported about a work axis and a cutter rotatably supported about a cutter axis such that the work axis and the cutter axis are offset from one another, synchronously rotating the work and the cutter at a predetermined ratio of an angular velocity, operating a first cutting process setting the cutter axis at a first posture in which a tooth trace direction of a gear-shaped first cutter portion arranged at a first end of the cutter is along a tooth trace direction of the work, setting a first cutting direction in which the first cutter portion is arranged at a downstream in a moving direction of the cutter in a direction along the work axis, starting the cutting of the work by moving the cutter in the first cutting direction while maintaining a cutting depth of the work, the cutting depth attained by using the first cutter portion, at a setting value and reducing the cutting depth of the work before the first cutter portion reaches an end portion of a cutting area in the first cutting direction in the process of the cutting of the work and operating a second cutting process synchronously rotating the work and the cutter in a reverse direction of rotational directions of the work and the cutter in the first cutting process after the first cutting process, setting the cutter axis at a second posture in which the tooth trace direction of a gear-shaped second cutter portion arranged at a second end of the cutter is along the tooth trace direction of the work, maintaining the cutting depth of the work, the cutting depth attained by using the second cutter portion, at the setting value, and cutting the end portion of the cutting area by moving the cutter in a second cutting direction, a reverse direction of the first cutting direction.

According to an aspect of this disclosure, a method for processing a gear includes processes of arranging a work rotatably supported about a work axis and a cutter rotatably supported about a cutter axis such that the work axis and the cutter axis are offset from one another, synchronously rotating the work and the cutter at a predetermined ratio of an angular velocity, operating a first cutting process setting the cutter axis at a first posture in which a tooth trace direction of a gear-shaped first cutter portion arranged at a first end of the cutter is along a tooth trace direction of the work, setting a first cutting direction in which the first cutter portion is arranged at a downstream in a moving direction of the cutter in a direction along the work axis, starting the cutting of the work by moving the cutter in the first cutting direction while maintaining a cutting depth of the work, the cutting depth attained by using the first cutter portion, at a setting value, and maintaining the cutting of the work until the first cutter portion reaches an end portion of a cutting area in the first cutting direction, and operating a second cutting process synchronously rotating the work and the cutter in a reverse direction of rotational directions of the work and the cutter in the first cutting process after the first cutting process, setting the cutter axis at a second posture in which the tooth trace direction of a gear-shaped second cutter portion arranged at a second end of the cutter is along the tooth trace direction of the work, increasing the setting value of the cutting depth of the work, the cutting depth attained by using the second cutter portion, by a setting amount, and cutting the end portion of the cutting area by moving the cutter in a second cutting direction, a reverse direction of the first cutting direction, by a predetermined length.

According to another aspect of this disclosure, a cutter for gear processing includes a first cutter portion formed in a gear shape and arranged at a first end of the cutter, and a second cutter portion formed in the gear shape and arranged at a second end of the cutter in which the cutter is rotatable about a cutter axis and a same pitch circle, a same number of a tooth and a same form of a blade are applied to the first cutter portion and the second cutter portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
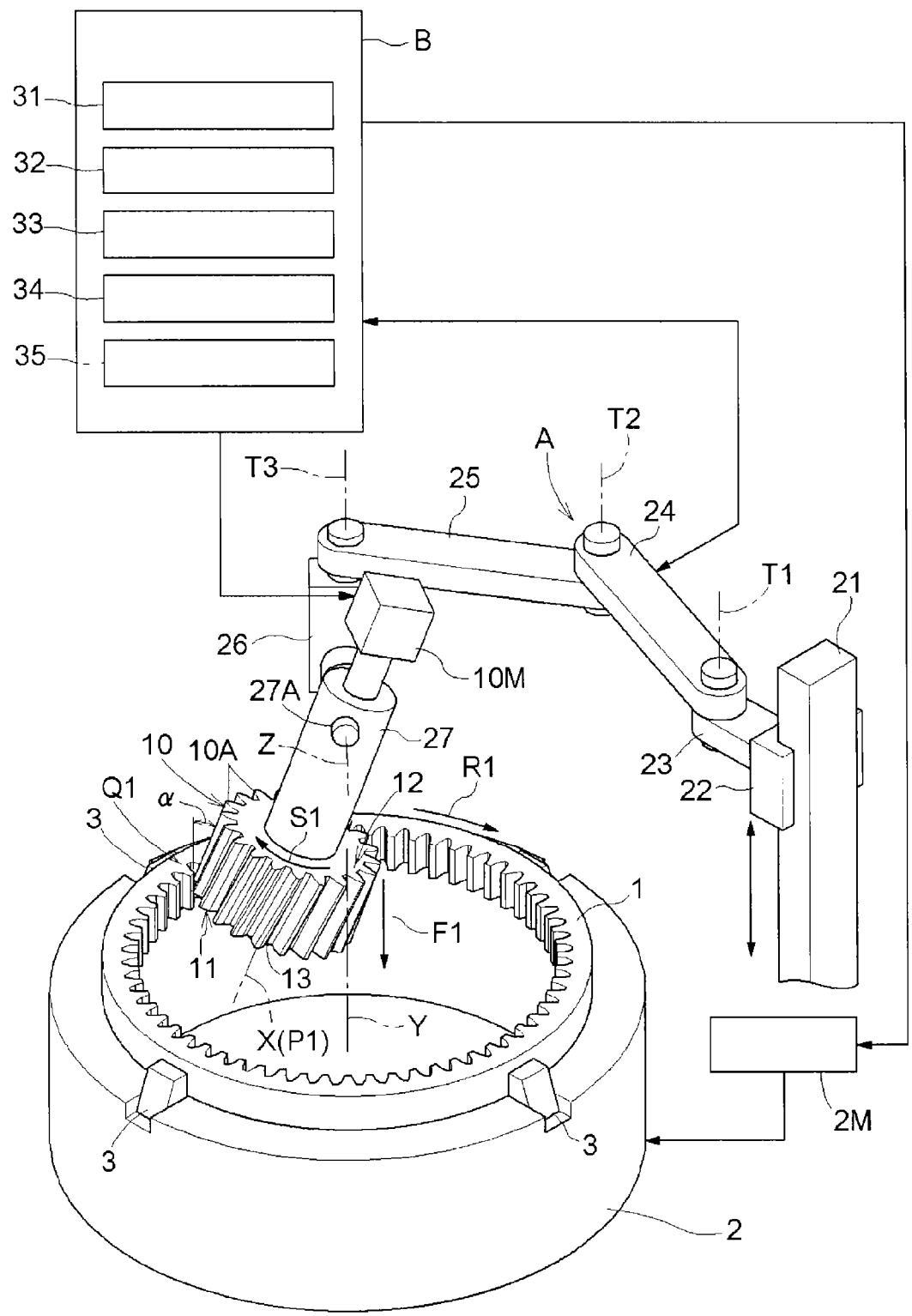
FIG. 1 is a view schematically illustrating a configuration of a gear processing machine using a skiving technology according to a first embodiment disclosed here.
Figure 2:
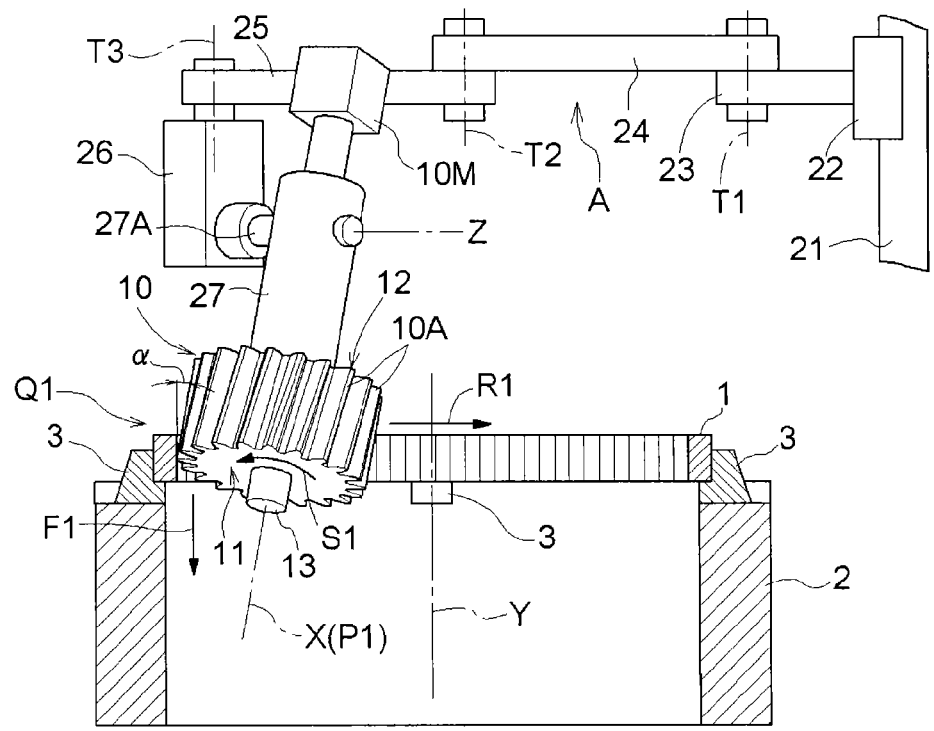
FIG. 2 is a side view illustrating a work and a cutter in a first cutting process.
Figure 3:
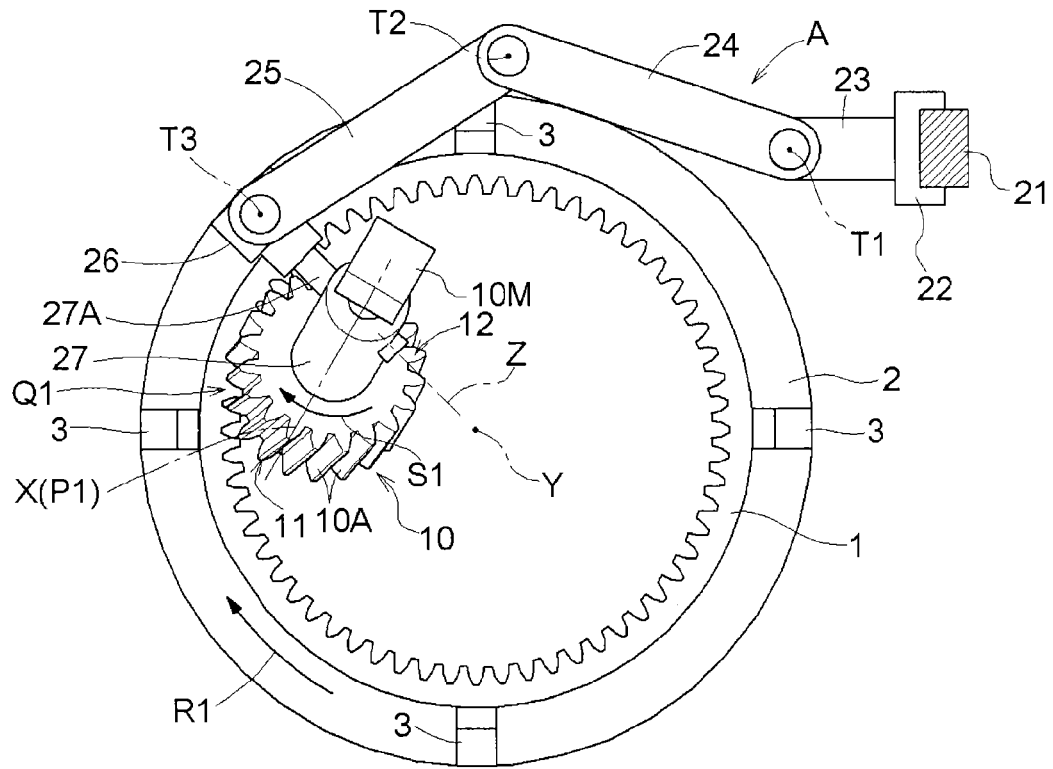
FIG. 3 is a plan view illustrating the work and the cutter in the first cutting process.

Embodiments of the disclosure will be described referring to figures using an example of a process of an internal spur gear. A first embodiment of the gear processing machine using a skiving technology for a method for processing a gear of the disclosure is configured as illustrated in FIGS. 1 to 3. The gear processing machine includes a table 2, a cutter 10, an operation unit A and a control unit B. The table 2 supports a ring-shaped work 1 as a cutting target. The pinion-shaped cutter 10 processes the work 1 (an example of a cutter for gear processing). The operation unit A operates the cutting using the cutter 10. The control unit B controls the table 2, the cutter 10 and the operation unit A.

The table 2 is rotatably supported about a work axis Y of the work 1, the work axis Y arranged at a vertical direction of the table 2. The table 2 fixedly supports the processing target, the work 1, using plural chucks 3 and is rotationally driven by a table motor 2M. The cutter 10 is formed in a helical gear-shape and rotatably supported about a cutter axis X of the cutter 10 by an end portion of the operation unit A. A synchronous motor for controlling a rotational speed of the table 2 by being rotated synchronizing with a drive signal is applied to the table motor 2M.

Figure 7A:
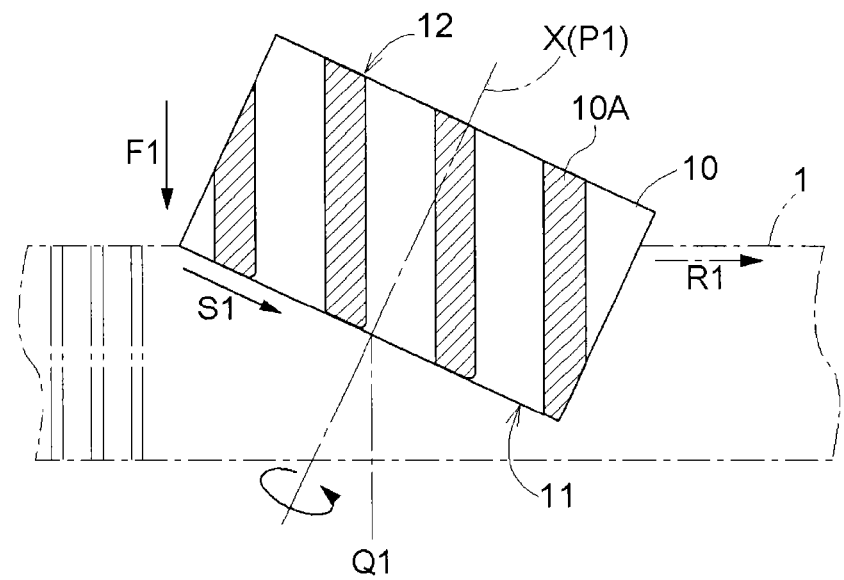
FIG. 7A is a schematic view illustrating a relative position of a blade portion of the cutter and the work in the first cutting process.

The gear processing machine using the skiving technology of the first embodiment is configured such that the cutter axis X and the work axis Y are offset from one another so that a tooth trace direction of the work 1 and a tooth trace direction of a blade portion 10A of the cutter 10 are arranged in parallel with one another (see FIG. 7). Under the relative position of the cutter axis X and the work axis Y, a speed vector of the blade of the cutter 10 (a direction of S1 in FIG. 7A) and a speed vector of the work 1 (a direction of R1 in FIG. 7A) are different. Accordingly, a slip speed is generated between the work 1 and the cutter 10 due to the difference of the speed vector of the blade of the cutter 10 and the speed vector of the work 1. The cutter 10 moves in the direction along the axis of the work 1, that is, the work axis Y, to cut the work 1 in response to the slip speed while the cutter 10 and the work 1 synchronously rotate one another.

In this process, the internal spur gear may be formed on an inner circumference of the work 1. Alternatively, the processing system may be set to form an inner helical gear. When processing the helical gear, the cutter 10 is moved in the direction along the work axis Y while applying a differential movement to gradually displace the relative position of the cutter 10 and the work 1 while synchronously rotating the cutter 10 and work 1 one another.

Figure 10:
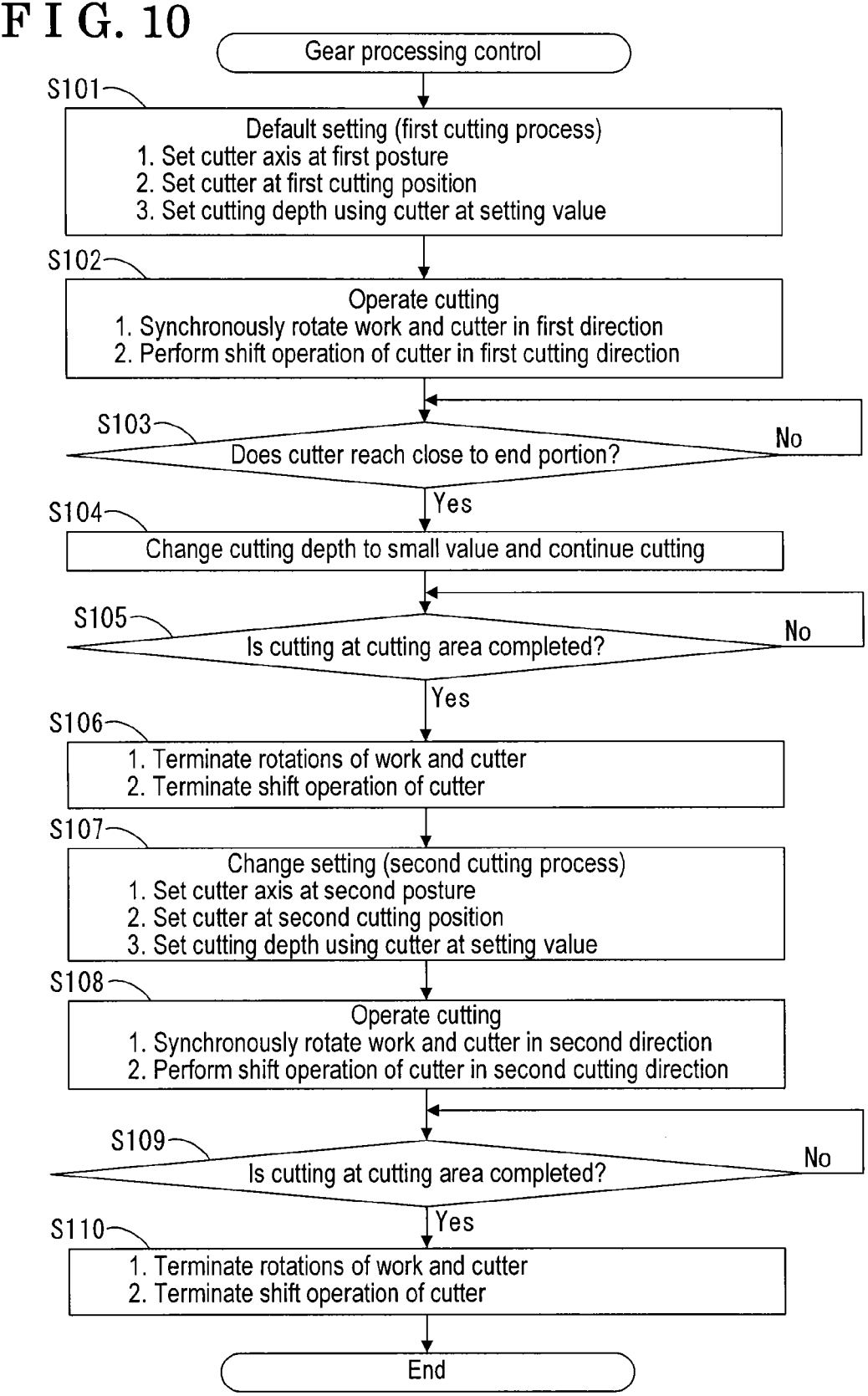
FIG. 10 is a flowchart showing a gear processing control of the gear processing machine.

Further, the gear processing machine using the skiving technology of the first embodiment reduces burrs (poison burrs) generated at the work 1 by operating a second cutting process in which the cutter 10 performs a shift operation in a second cutting direction F2 (see FIGS. 6 and 8) which is a reverse direction of a first cutting direction F1 (see FIGS. 2 and 8) after the cutter 10 performs the shift operation in the first cutting direction F1 in a first cutting process (see a flowchart in FIG. 10).

The cutter 10 is formed in a helical gear shape by forming helical-shaped grooves on an outer surface of a high-hardness cylindrical base material, for example, high-speed steel so that the plural blade portions 10A include a predetermined twist angle. The cutter 10 is in a category of a cylindrical gear whose pitch circle corresponds to the diameter of the cylindrical gear. A first end in the direction of the cutter axis X including edge portions of the plural blade portions 10A is a first cutter portion 11. A second end in the direction of the cutter axis X including the edge portions of the plural blade portions 10A is a second cutter portion 12. In a case where the work 1 is processed to create a helical gear, the shape of the cutter 10 can be either a helical gear shape or a spur gear shape.

For example, the first end of the base material of the cutter 10 is ground in a posture, or attitude orthogonal to the cutter axis X to form the edge-shaped first cutter portion 11. The second end of the base material of the cutter 10 is ground in the posture, or attitude orthogonal to the cutter axis X to form the edge-shaped second cutter portion 12. Thus, the same pitch circle, the same number of the tooth and the same form of the blade are applied to the first cutter portion 11 and the second cutter portion 12.

The cutter 10 is supported by an end portion of a cutter spindle 13 which is rotationally driven by a cutter motor 10M. The synchronous motor for controlling a rotational speed of the cutter 10 by synchronously rotating with a drive signal is applied to the cutter motor 10M.

The gear processing machine of the first embodiment applies the table motor 2M to rotationally drive the work 1 while applying the cutter motor 10M to rotationally drive the cutter 10. Alternatively, the work 1 and the cutter 10 can be synchronously rotated by being operated in conjunction with, for example, plural gears and plural timing belts.

The operation unit A includes a guide member 21, a slide member 22, a base end arm 23, a middle arm 24, an end arm 25, an operation arm 26 and a cutter supporting member 27. The guide member 21 is formed in a rail shape and arranged in parallel with the work shaft Y. The slide member 22 is movably supported by the guide member 21 in a longitudinal direction. A base end of the base end arm 23 is supported by the slide member 22. The base end arm 23, the middle arm 24, the end arm 25, the operation arm 26 and the cutter supporting member 27 are connected in a row.

The middle arm 24 is swingably connected to the base end arm 23 about a first axis T1. The end arm 25 is swingaly connected to a swinging end of the middle arm 24 about a second axis T2. The operation arm 26 is rotatably connected to a swinging end of the end arm 25 about a third axis T3.

The first, second and third axes T1, T2 and T3 are positioned to be parallel with the work axis Y. The operation arm 26 protrudes in a direction along the work axis Y. A protrusion end of the operation arm 26 swingably supports the cutter supporting member 27 about a switching axis Z which is positioned orthogonal to the work axis Y.

The cutter spindle 13 is rotatably supported by the cutter supporting member 27 about the cutter axis X. The cutter 10 is mounted on a first end portion of the cutter spindle 13 while the cutter motor 10M is mounted on a second end portion of the cutter spindle 13. A supporting shaft 27A is arranged at a side surface of the cutter supporting member 27 such that the supporting shaft 27A extends on the same axis as the switching axis Z which is positioned orthogonal to the cutter axis X. The supporting shaft 27A is swingably supported by the operation arm 26.

The slide member 22 operates sliding movement in a longitudinal direction of the guide member 21 using a slide actuator, for example, an electric cylinder. The operation amount of the slide member 22 is detected by a linear sensor. A swinging movement of the middle arm 24 relative to the base end arm 23 about the first axis T1 and the swinging movement of the end arm 25 relative to the middle arm 24 about the second axis T2 are operated by a corresponding actuator, for example, an electric motor. Each of the swing amounts of the middle arm 24 and the end arm 25 is detected by a swinging sensor.

A rotation of the operation arm 26 about the third axis T3 relative to the end arm 25 is operated by a rotational actuator, for example, the electric motor. A rotation angle of the operation arm 26 is detected by a rotational sensor. A swinging movement of the cutter supporting member 27 about the switching axis Z relative to the operation arm 26 is operated by a swing actuator, for example, the electric motor. A swing amount of the cutter supporting member 27 is detected by the swing sensor. A driving force of the swing actuator is transmitted to the cutter supporting member 27 via the supporting shaft 27A. The posture, or attitude of the cutter axis X is defined by the swinging movement of the cutter supporting member 27.

The operation unit A includes plural actuators actuating each of the members independently and plural sensors detecting the operation amounts of the members. Each of the actuators is controlled by a drive signal of the control unit B. Detection signals from the plural sensors are fed back to the control unit B.

According to the first embodiment, the gear processing machine using the skiving technology includes the work axis Y rotatably supporting the work 1, the cutter axis X rotatably supporting the cutter 10, the switching axis Z for switching the posture, or attitude of the cutter axis X and the third axis T3 for setting an apparent clearance angle α of the cutter 10 in combination with the switching axis Z. Further, the operation unit A includes the first axis T1 and the second axis T2 for swinging the middle arm 24 and the end arm 25, respectively. Totally, six axes are provided to operate the gear processing machine.

Other examples of the basic configuration of a gear processing machine using the skiving technology will be described as follows. The configuration of the operation unit A is not limited to the configuration illustrated in FIGS. 1 and 2. A ball screw mechanism popularly applied to general machine tools, or multi-joint robot arms may be adopted. For example, in a case where the multi-joint robot arms are applied, respective positions of the cutter axis X and the cutter supporting member 27 rotatable about the switching axis Z are set by the swinging movement of plural joint arms. The operation system of the gear processing machine may be set such that the cutter 10 may perform the shift operation in a cutting direction by the swinging movement of the plural joint arms.

The gear processing machine may include a configuration in which the table 2 moves in a direction along the work axis Y or in a direction orthogonal to the work axis Y by actuating an actuator. In particular, the table 2 moves in a cross-shaped direction on a virtual plane orthogonal to the work axis Y. According to the aforementioned configuration of the gear processing machine, the operating configuration of the operation unit A may be simplified and the operation amount of the operation unit A may be reduced. Further, the relative position of the cutter 10 and the work 1 may be set without actuating the operation unit A.

The gear processing machine of the first embodiment includes the work axis Y rotatably supporting the work 1, the cutter axis X rotatably supporting the cutter 10, the switching axis Z for switching the posture, or attitude of the cutter axis X and an axis (the third axis T3 in the first embodiment) for setting an apparent clearance angle α of the cutter 10 in combination with the switching axis Z. In addition, the operation unit A includes a single axis for switching a position of the cutter 10 from a first cutting position Q1 to a second cutting position Q2. That is, the gear processing machine may be configured with total five axes for operation. Then, the gear processing machine requires the configuration in which the cutter 10 and the work 1 relatively move in a direction along the work axis Y one another for operating in a first cutting direction F1 and in a second cutting direction F2.

Another example of a minimum configuration of the gear processing machine that operates the process of the first embodiment will be described as follows. Considering a configuration of the gear processing machine in which the table 2 moves in the cross-shaped direction on the virtual plane orthogonal to the work axis Y, the configuration of the gear processing machine may be as follows. The gear processing machine includes the work axis Y rotatably supporting the work 1, the cutter axis X rotatably supporting the cutter 10, the switching axis Z for switching the posture of the cutter axis X and the axis (the third axis T3 in the first embodiment) for setting the apparent clearance angle α of the cutter 10 in combination with the switching axis X. That is, the gear processing machine may be configured with total four axes for operation. Under the configuration, the movement of the cutter 10 from the first cutting position Q1 to the second cutting position Q2 is operated by moving the table 2. Further, the gear processing machine requires the configuration in which the cutter 10 and the work 1 relatively move in a direction along the work axis Y one another for operating the cutter 10 in the first cutting direction F1 and in the second cutting direction F2.

The control unit B includes a microprocessor and a DSP, that is, a digital signal processor for running software for the gear processing using the skiving technology. The control unit B includes a synchronous rotation control unit 31, a cutter posture control unit 32, a relative position setting unit 33, a cutting depth setting unit 34, and a cutting operation control unit 35 as software. The control unit B includes an output interface, an output system and an input interface. The output interface outputs a control signal to drive circuits of the table motor 2M and the cutter motor 10M. The output system outputs the control signal to the drive circuit of each of the actuators of the operation unit A. The input interface inputs a detection signal of each of the sensors from the operation unit A.

The synchronous rotation control unit 31, the cutter posture control unit 32, the relative position setting unit 33, the cutting depth setting unit 34 and the cutting operation control unit 35 may be configured with either hardware, for example, logic circuit or a combination of hardware, for example, logic circuit and software.

The synchronous rotation control unit 31 controls the table motor 2M and the cutter motor 10M so that a predetermined gear processing using the skiving technology at a contact portion of an inner circumference of the work 1 and an outer circumference of the cutter 10 is operated. The synchronous rotation control unit 31 may control the work 1 and the cutter 10 to switch the respective rotational directions. In the second cutting process, the synchronous rotation control unit 31 controls the work 1 and the cutter 10 to rotate in a reverse rotational direction compared to the rotational direction in the first cutting process.

The cutter posture control unit 32 controls the cutter axis X to set the posture by swinging the cutter supporting member 27 about the switching axis Z in the operation unit A. The cutter posture control unit 32 controls the cutter 10 to set the apparent clearance angle α relative to the work 1 by setting the rotational position of the operation arm 26 about the third axis T3 (see FIGS. 8 and 9). The posture of the cutter axis X and the apparent clearance angle α are set individually in the first cutting process and the second cutting process.

FIG. 7 is a schematic cross-sectional view of a portion of the blade portions 10A of the cutter 10, the portion being in contact with the work 1 to operate the cutting of the work 1. As illustrated in FIG. 7, the cutter posture control unit 32 controls the cutter 10 to set a tooth trace direction of the portion of the blade portion 10A of the cutter 10, the portion operating the cutting of the work 1 along (in parallel) with a tooth trace direction of the work 1 in the first cutting process and the second cutting process.

Figure 5:
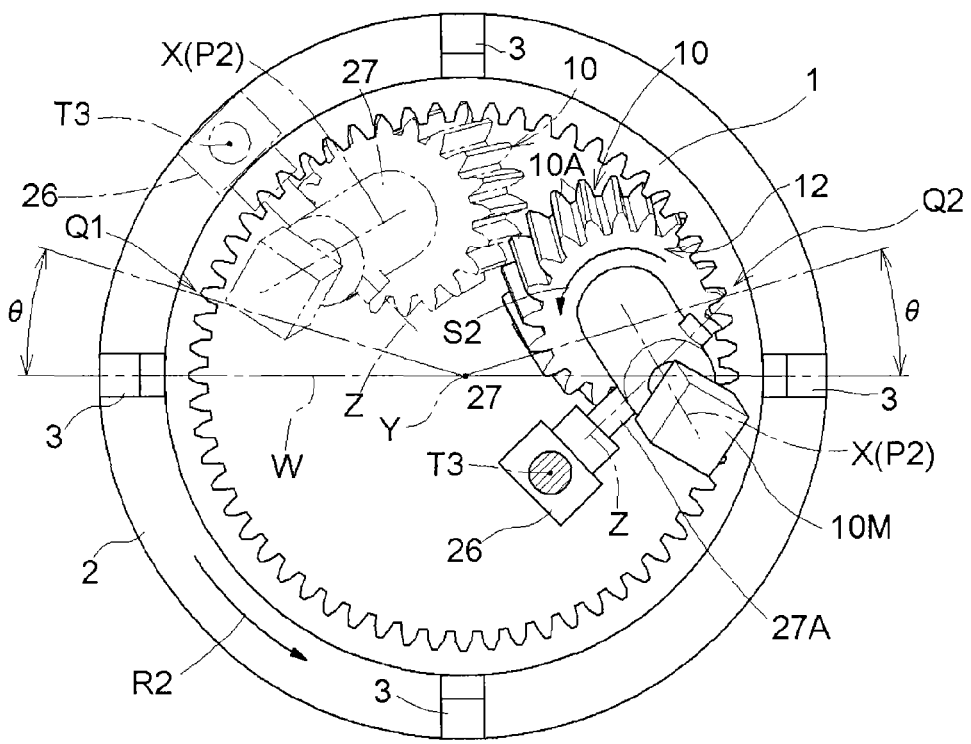
FIG. 5 is a plan view illustrating the work and the cutter immediately before a second cutting process is started.

The relative position setting unit 33 sets the relative position of the work 1 and the cutter 10. That is, as illustrated in FIG. 3, the relative position of the work 1 and the cutter 10 is set at the first cutting position Q1 in the first cutting process. As illustrated in FIG. 5, the relative position of the work 1 and the cutter 10 is set at the second cutting position Q2 in the second cutting process. The relative position of the first cutting position Q1 and the second cutting position Q2 is illustrated in FIG. 5. That is, in a plan view, a straight line passing through the work axis Y is defined as a base line W. A line connecting the work axis Y and the first cutting position Q1 is defined as a virtual line. Then, a cross angle of the virtual line and the base line W is defined as an angle θ. Then, at an opposite side across the work axis Y, the cross angle of the virtual line and the base line W, the straight line passing through the work axis Y, is arranged as the angle θ (the same degree as the aforementioned angle θ). A cross point of the virtual line and the inner circumference of the work 1 is defined as the second cutting position Q2. The relative positions of the first cutting position Q1 and the second cutting position Q2 may be described such that the first cutting position Q1 and the second cutting position Q2 are positioned opposite across the work axis Y and the respective cross angles of the respective virtual lines and the respective base lines W have the same degree.

The cutting depth setting unit 34 sets a cutting depth of the work 1 when the work 1 is cut using the first cutter portion 11 and the second cutter portion 12 by activating each of the members of the operation unit A.

Figure 6:
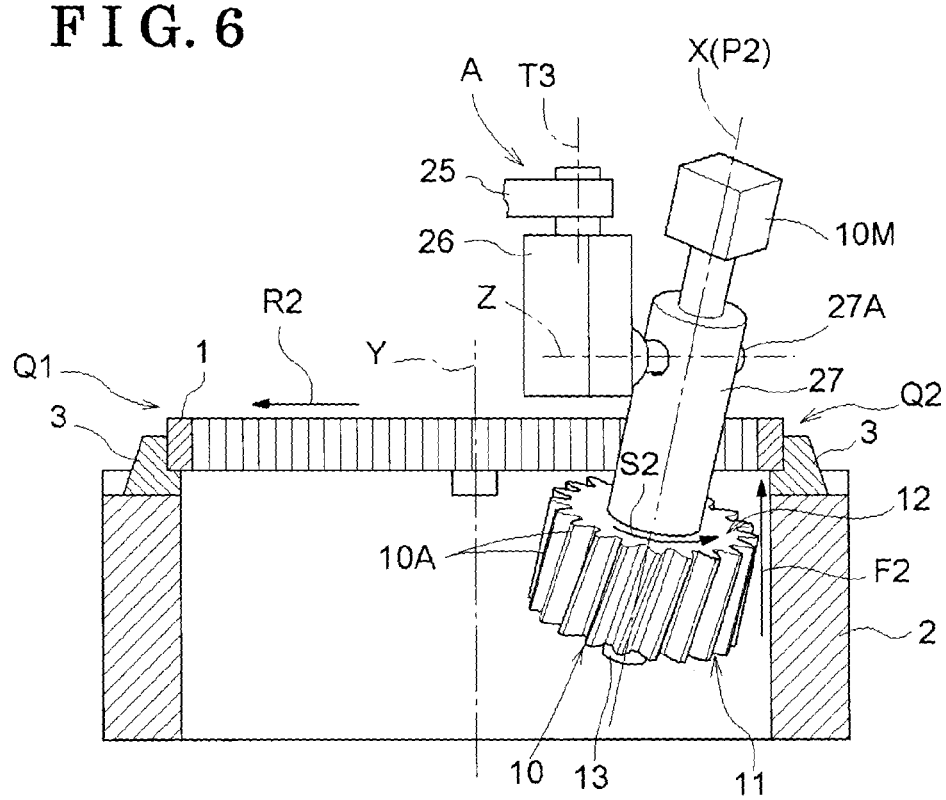
FIG. 6 is a side view illustrating the work and the cutter immediately before the second cutting process is started.

The cutting operation control unit 35 controls the slide member 22 to slide relative to the guide member 21 in the operation unit A. The cutter 10 is moved in the direction along the work axis Y to operate the cutting of the work 1. That is, as illustrated in FIG. 2, the cutting operation control unit 35 controls the whole operation unit A to move downward (in the first cutting direction F1) in the first cutting process. As illustrated in FIG. 6, the cutting operation control unit 35 controls the whole operation unit A to move upward (in the second cutting direction F2) in the second cutting process.

An overview of the gear processing control by the control unit B is shown in a flowchart in FIG. 10. In a case where the gear processing is operated, the cutting of the work 1 is operated after a default setting for the first cutting process (Step S101, Step S102).

Figure 8A:
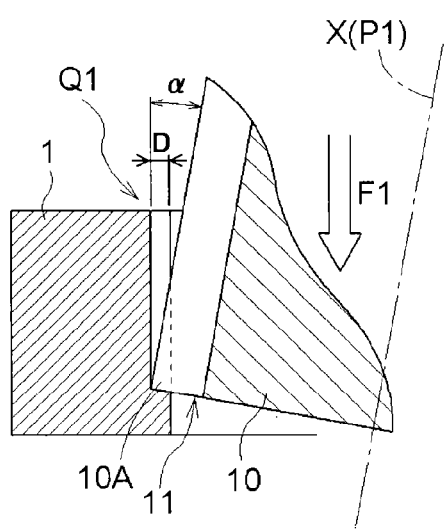
FIG. 8A is a cross-sectional view illustrating a cutting amount of the work in the first cutting process.
Figure 8B:
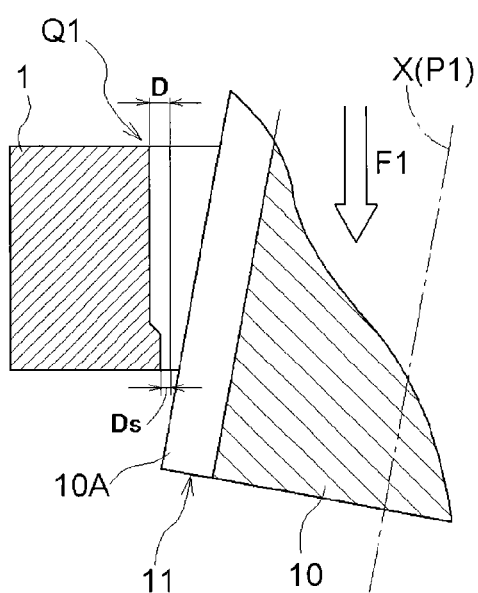
FIG. 8B is a cross-sectional view illustrating the cutting amount of the work in the first cutting process when the cutting of the work is terminated.

In the default setting, as illustrated in FIGS. 2 and 3, the cutter posture control unit 32 controls the cutter 10 to set the posture of the cutter axis X to a first posture P1 by swinging the cutter supporting member 27 about the switching axis Z and by rotating the operation arm 26 about the third axis T3. Accordingly, as illustrated in FIG. 7A, the cutter posture control unit 32 controls the cutter 10 to set the tooth trace direction of the portion of the blade portion 10A of the cutter 10, the portion operating the cutting of the work 1 along, or in parallel with, the tooth trace direction of the work 1. As illustrated in FIG. 8A, the cutter posture control unit 32 controls the cutter 10 to set the apparent clearance angle α of the cutter 10 relative to the work 1. As illustrated in FIG. 3, the relative position setting unit 33 sets the relative position of the work 1 and the cutter 10 at the first cutting position Q1. As illustrated in FIG. 8B, the cutting depth setting unit 34 sets the cutting depth of the work 1 attained by the cutter 10 to a setting value D.

Next, the synchronous rotation control unit 31 controls the work 1 and the cutter 10 to synchronously rotate at a ratio of the angular velocity required for the gear processing. The cutting operation control unit 35 controls the whole operation unit A to operate the shift operation to move downward in the first cutting direction F1 and the cutter 10 starts the cutting of the work 1 by the first cutter portion 11. At the time of the cutting of the work 1, the work 1 rotates in a first main rotational direction R1 while the cutter 10 rotates in a first sub rotational direction S1. The first main rotational direction R1 of the work 1 and the first sub rotational direction S1 of the cutter 10 are collectively defined as a first direction (see the flowchart in FIG. 10).

When the work 1 rotates in the first main rotational direction R1 while the cutter 10 synchronously rotates in the first sub rotational direction S1, the difference of the axes of the work 1 and the cutter 10 at the contact portion of the work 1 and the first cutter portion 11 causes a slide. The shift operation is operated to move the cutter 10 in the first cutting direction F1 and the cutting of the work 1 is operated in response to the slide.

The aforementioned cutting is defined as the first cutting process. In the first cutting process, the work 1 and the cutter 10 synchronously rotate with one another such that the blade portion 10A of the cutter 10 is meshed with the tooth groove formed at the inner circumference of the work 1. The work 1 is cut and processed to form the spur inner gear including plural teeth, the plural teeth whose tooth trace direction is arranged in parallel with the work axis Y.

In the first cutting process, as illustrated in FIG. 8A, the cutting depth of the work 1 is set to the setting value D (the first setting value) before the cutting of the work 1. In the first cutting process, the cutting position of the cutter 10 in the tooth trace direction of the work 1 is fed back to the control unit B. As illustrated in 8B, when the first cutter portion 11 reaches close to an end portion of the cutting area before reaching to the end portion of the cutting area, the cutting depth setting unit 34 changes the cutting depth of the work 1 to a second setting value Ds which is a smaller value than the setting value D (the first setting value). The first cutting process is continued with the changed cutting depth (Step S103, S104). The end portion of the cutting area is set to be closer to the end than a center of the cutting area. The second setting value Ds may be any value, for example, a half of the setting value D of the first cutting process. The cutting area corresponds to a value of the tooth width formed at the work 1. According to the first embodiment, when the first cutter portion 11 reaches close to the end portion of the cutting area, the cutting depth of the work 1 is set to be the second setting value Ds which is the smaller value than the setting value D, however is not limited to this. The same as aforementioned cutting of the work 1, the cutting depth of the work 1 may be changed from the setting value D to the second setting value Ds at an early stage after the first cutter portion 11 starts cutting from a start end portion of the cutting area, that is, at a position close to the start end portion (a position after a predetermined length of the setting area is cut from the start end position).

In this cutting process, the synchronous rotation control unit 31 controls the work 1 and the cutter 10 to stop the respective rotations of the work 1 and the cutter 10 after the whole body of the cutter 10 passes through the cutting area. Then, the shift operation of the cutter 10 in the first cutting direction F1 is terminated to finish the first cutting process (Step S105, S106).

When the first cutting process is terminated, an upper end of the cutter 10 is positioned lower than the work 1. After operating the setting change for the cutting of the work 1 in the second cutting process, the cutting of the work 1 in the second cutting process is operated (Step S107, S108).

Figure 4:
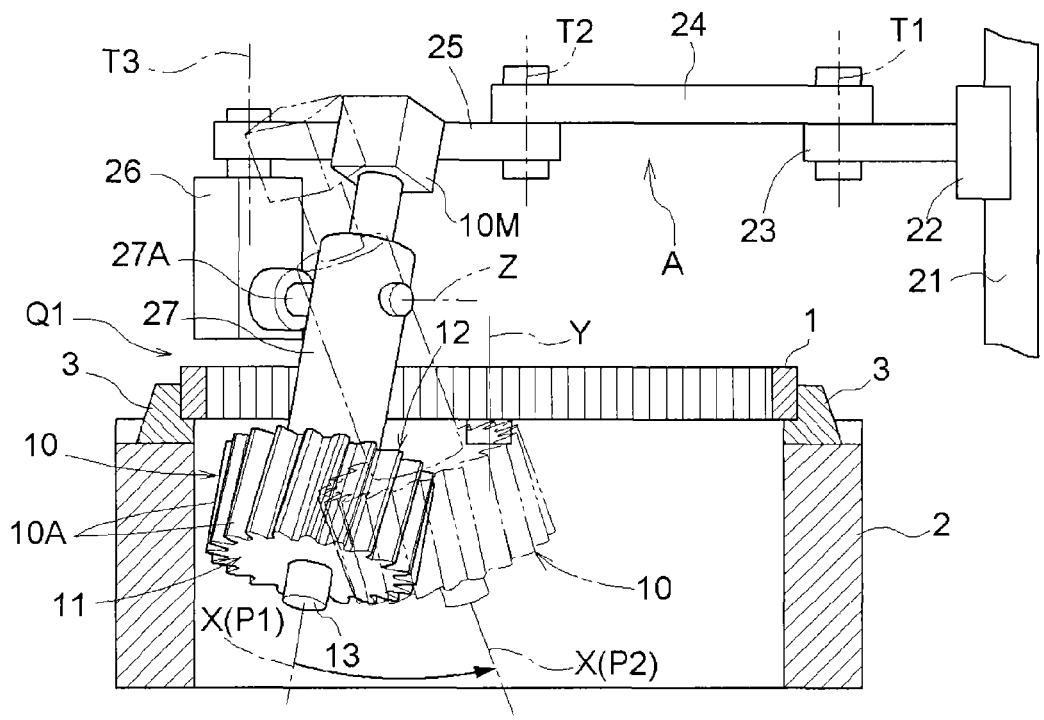
FIG. 4 is a side view illustrating the work and the cutter when the first cutting process is terminated.
Figure 7B:
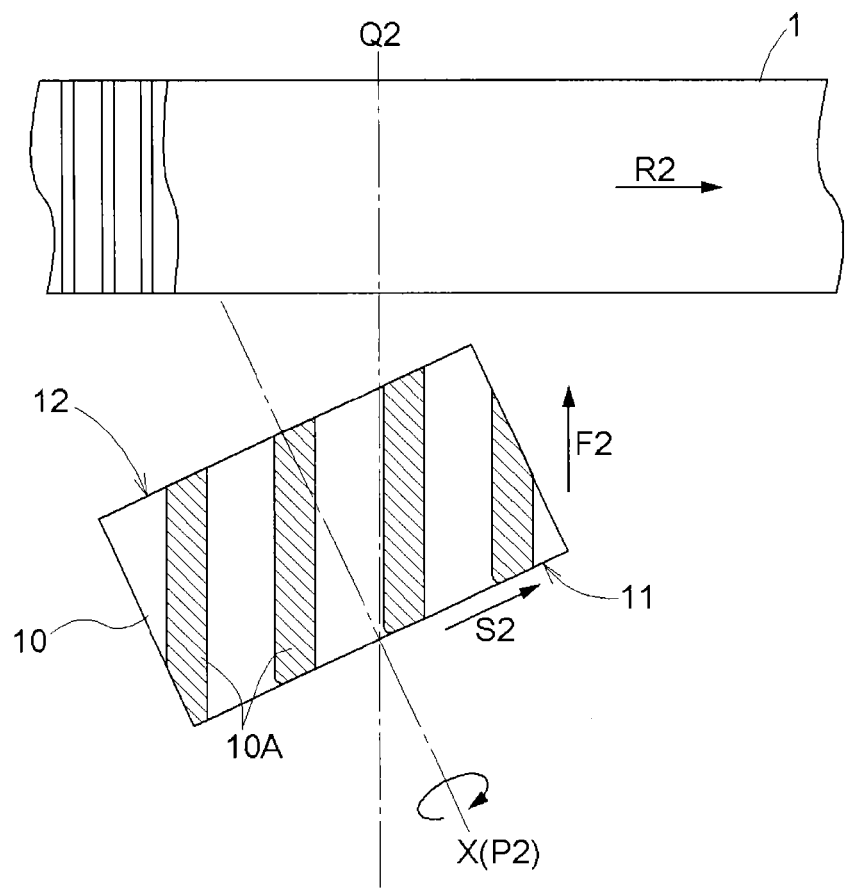
FIG. 7B is a schematic view illustrating the relative position of the blade portion of the cutter and the work in the second cutting process.
Figure 9A:
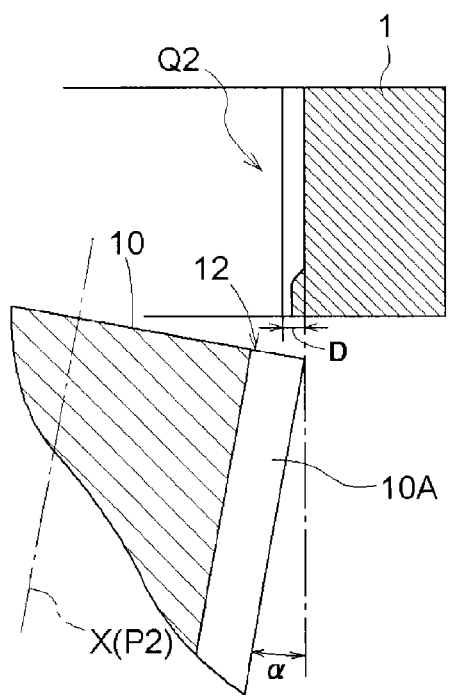
FIG. 9A is a cross-sectional view illustrating a cutting amount of the work in the second cutting process.

In this setting change, as illustrated in a virtual line in FIG. 4, the cutter posture control unit 32 controls the cutter supporting member 27 to swing about the switching axis Z and controls the operation arm 26 to rotate about the third axis T3. The relative position setting unit 33 controls the operation unit A to set the cutter 10 at the second cutting position Q2. As illustrated in FIG. 9A, the cutting depth setting unit 34 sets the cutting depth of the work 1 attained by the cutter 10 to the setting value D. Accordingly, as illustrated in FIG. 7B, the tooth trace direction of the portion of the blade portion 10A of the second cutter portion 12 of the cutter 10, the portion operating the cutting of the work 1 is set along the tooth trace direction of the work 1. As illustrated in FIG. 8B, the apparent clearance angle α of the cutter 10 relative to the work 1 is set.

That is, the posture, or attitude of the cutter axis X is set at the second posture P2 by swinging the cutter supporting member 27 about the switching axis Z. Accordingly, the tooth trace direction of the portion of the blade portions 10A of the cutter 10, the portion facing the second cutting position Q2 (opposite portion of the first cutting position Q1) is set along the tooth trace direction of the work 1. The operation arm 26 rotates about the third axis T3 to set the apparent clearance angle α of the cutter 10 relative to the work 1. When setting the cutter axis X at the second posture P2, setting the posture, or attitude of the portion of the blade portion 10A of the cutter 10, the portion of the portion corresponding to the second cutting position Q2, to the position along the tooth direction of the work 1 separates the second cutter portion 12 from the inner circumference of the work 1. For this reason, the apparent clearance angle α of the cutter 10 relative to the work 1 is set by rotating the operation arm 26. Further, the cutting depth setting unit 34 sets the cutting depth of the work 1 attained by the cutter 10 to the setting value D with the cutting position of the work 1 by the cutter 10 set at the second cutting position Q2 to make the second cutter portion 12 contact with the inner circumference of the work 1.

In this setting change, the swing movement of the cutter supporting member 27 about the switching axis Z, the rotation of the operation arm 26 about the third axis T3 and the operation of the operation unit A to move the cutter 10 to the second cutting position Q2 may be operated simultaneously. The time difference may be set for any operations as required.

When changing the posture, or attitude of the cutter axis X, the cutter supporting member 27 swings about the single switching axis Z. Therefore, compared to, for example, a known gear processing machine applying the multi-joint robot arms making a bending and stretching motion, the positioning of the cutter 10 may be easily switched from the first posture P1 to the second posture P2.

When the cutting of the work 1 is restarted in the second cutting process, the control unit B controls the positioning of the tooth groove formed at the work 1 in the first cutting process and the blade portion 10A of the cutter 10 to be matched with one another. To operate this positioning, the control unit B controls the respective swing postures, or swing attitudes of the middle arm 24, the end arm 25 and the operation arm 26 in response to the previously acquired information of the work 1 and the cutter 10. Accordingly, as illustrated in FIG. 5, the control unit B controls the cutter 10 to move to the second cutting position Q2. The relative position of tooth groove formed at the work 1 and the blade portion 10A of the cutter 10 is set by rotating at least one of the table motor 2M and the cutter motor 10M.

A dedicated sensor may be applied to detect the relative position of the tooth groove formed at the work 1 and the blade portion 10A of the cutter 10 to enhance the accuracy of the positioning. The sensor may include, for example, a member contacting the tooth groove formed at the work 1 and the blade portion 10A, or may optically detect the tooth groove formed at the work 1 and the blade portion 10A.

Figure 9B:
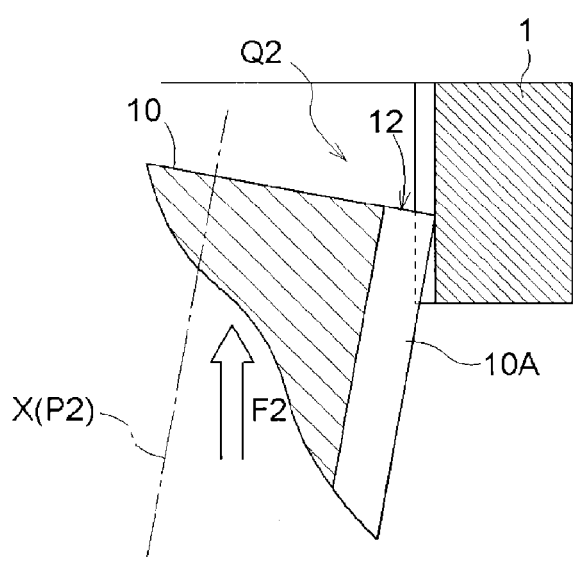
FIG. 9B is a cross-sectional view illustrating the cutting of the work in the second cutting process.

Next, the synchronous rotation control unit 31 controls the work 1 and the cutter 10 to synchronously rotate at the ratio of the angular velocity required for the gear processing using skiving technology in a second direction, the reverse direction of the rotational directions of the work 1 and the cutter 10 in the first cutting process. As illustrated in FIG. 6, the cutting operation control unit 35 controls the whole operation unit A to operate the shift operation to move upward in the second cutting direction F2 and restarts the cutting of the work 1. In the second cutting process, as illustrated in FIG. 9A, the cutting depth of the work 1 is set to the setting value D before cutting the work 1. The cutting of the work 1 is proceeded as illustrated in FIG. 9B. At the time of the rotation in the second direction, the work 1 rotates in a second main rotational direction R2 while the cutter 10 rotates in a second sub rotational direction S2. (see the flowchart in FIG. 10).

When the work 1 rotates in the second main direction R2 and the cutter 10 synchronously rotates with the work 1 in the second sub rotational direction S2, the work 1 and the cutter 10 synchronously rotate with one another such that the blade portion 10A of the cutter 10 is meshed with the tooth groove formed at the inner circumference of the work 1. The offset of the axes of the work 1 and the cutter 10 causes the slide at the contact portion of the work 1 and the second cutter portion 12. The second cutting process is operated to cut the work 1 in the tooth trace direction in response to the slide.

In the second cutting process, the cutting position of the cutter 10 by the second cutter portion 12 is fed back to the control unit B. After the cutting of the work 1 in the cutting area is completed, the control is terminated by stopping the respective rotations of the work 1 and the cutter 10 and the shift operation of the cutter 10 (see Step S109, S110).

In the second cutting process, the cutter 10 may not have to move the whole cutting area. For example, a control system may be set such that the cutter 10 is separated from the work 1 to terminate the cutting operation when the second cutter portion 12 reaches a center position of the cutting area. By setting the control system as above, efficient processing may be operated by preventing a wasteful operation.

The configuration of the operation unit A may include a mechanical interconnecting mechanism, for example, a gear interconnecting mechanism. That is, in a case where the cutter axis X is switched by swinging the cutter supporting member 27 about the switching axis Z from the first posture P1 to the second posture P2 to move the cutter 10 to the second cutting position Q2, the mechanical interconnection mechanism rotates the operation arm 26 about the third axis T3 by interconnecting with the switching movement of the cutter 10 to the second cutting position Q2. By including the aforementioned mechanical interconnecting mechanism, the actuator for rotating the operation arm 26 about the third axis T3 may not be required.

According to the first embodiment, following effects and advantages are attained. In the first cutting process, the work 1 is processed by the cutter 10 with the skiving technology at a high speed. The cutting depth of the work 1 is reduced before the cutter 10 reaches the end portion of the cutting area of the cutter 10. Thus, small burrs (poisson burrs) formed at the end portion of the cutting area (lower end portion in FIG. 8) may be removed by cutting the cutting area which includes the burrs in the second cutting process. The burrs may be removed without setting an extra cutting process for removing the burrs.

According to the gear processing machine using the skiving technology of the first embodiment, the cutter 10 does not have to include an extra configuration. Thus, the cutter 10 conventionally used for skiving may be used. The cylindrical gear-shaped cutter 10 used for the processing enhances the sharpening performance easily by grinding the respective edge portions of the first end portion of the first cutter portion 11 and, the second end portion of the second cutter portion 12. According to the gear processing machine using the skiving technology of the first embodiment, the high-quality cutting processing may be maintained by the replacement of the cutter 10.

The switching of the tooth trace direction of the blade portion 10A of the cutter 10 from the posture, or attitude for cutting the work 1 in the first cutting process to the posture, or attitude in the second cutting process may be simply operated by swinging the cutter supporting member 27 about the switching axis Z. Setting of the apparent clearance angle α of the cutter 10 may be simply operated by rotating the operation arm 26 about the third axis T3.

The posture, or attitude of the cutter axis X is defined by switching the respective posture, or attitudes of the switching axis Z and the third axis T3. Thus, any torsion angle may be applied to the blade portion 10A of the cutter 10.

The aforementioned embodiment may be changed, or modified as follows.

According to a second embodiment of the disclosure, as illustrated in FIG. 11, the switching axis Z may be set at a position passing through a center position in the axial direction of the cutter 10. The switching axis Z is a position where the posture, or attitude of the second cutter portion 12 may be switched to face the inner circumference of the work 1 while maintaining the cutter 10 at the first cutting position Q1 when the cutter supporting member 27 swings about the switching axis Z. That is, the posture, or attitude of the switching axis Z is set to be orthogonal to the virtual plane including the first cutting position Q1 and the work axis Y and to intersect with a position of the half of the length of the cutter 10 in a direction along the cutter axis X.

Figure 11A:
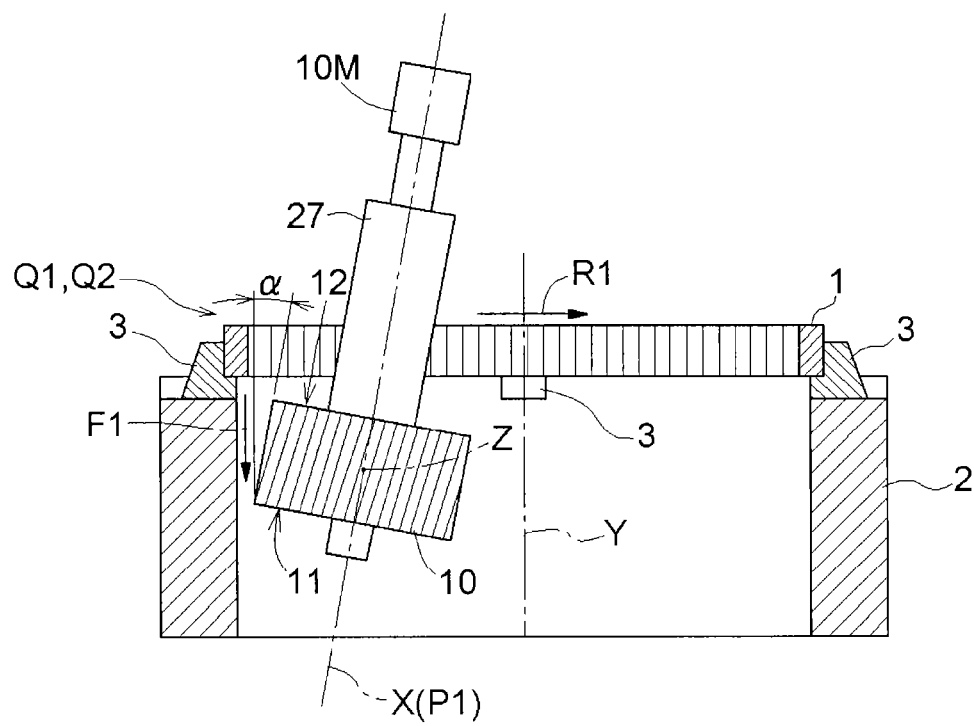
FIG. 11A is a perspective view illustrating each posture, or attitude of the work and the cutter when the first cutting process is terminated according to a second embodiment.
Figure 11B:
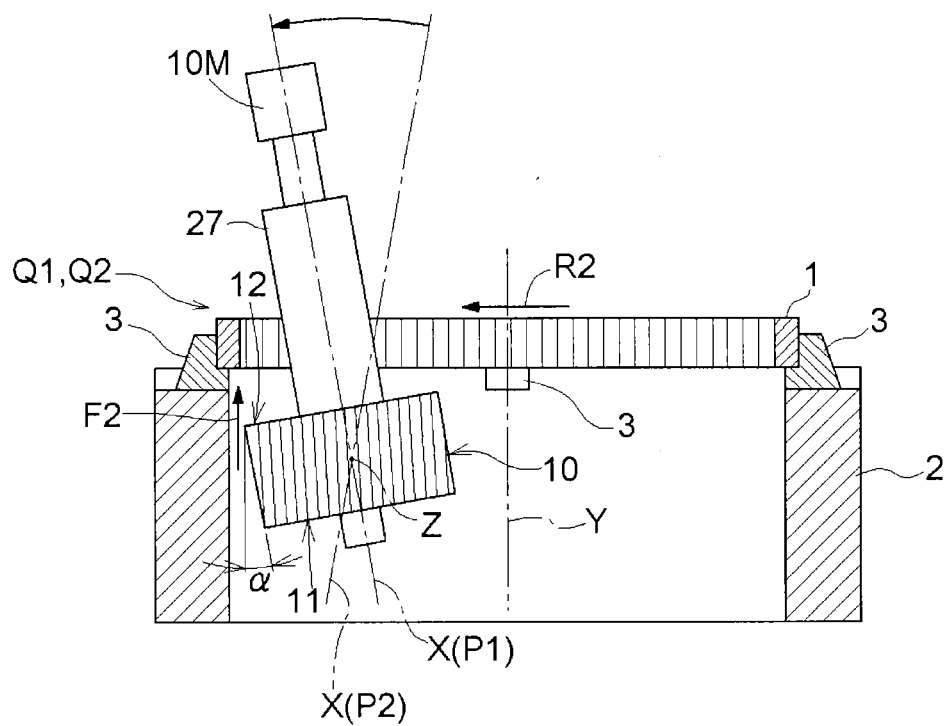
FIG. 11B is a perspective view illustrating each of the postures, or attitudes of the work and the cutter when the second cutting process is started according to the second embodiment.

FIG. 11A illustrates, in the first process, the setting of the cutter axis X at the first posture P1, the setting of the apparent clearance angle α of the cutter 10 relative to the work 1, and the position of the cutter 10 immediately after the cutting of the work 1 is operated by synchronously rotating the work 1 and the cutter 10 one another in the first direction. In the first cutting process, the cutting of the work 1 is operated by the first cutter portion 11 of the cutter 10. After the first cutting process, as illustrated in FIG. 11B, the cutter axis X is switched to the second posture P2 to be centered about the switching axis Z.

By switching the cutter axis X to the second posture P2, the posture, or attitude of the cutter 10 may be switched while maintaining the tooth trace direction of the portion of the blade portion 10A of the cutter 10, the portion operating the cutting of the work 1 along the tooth trace direction of the work 1. Further, by setting a new apparent clearance angle α of the cutter 10 relative to the work 1, the cutting of the work 1 by the second cutter portion 12 may be operated. The degree of the apparent clearance angle α when the cutter axis X is at the first posture P1 and the degree of the apparent clearance angle α when the cutter axis X is at the second posture P2 may be set to the same value.

By setting the posture, or attitude of the switching axis Z at the position passing through a center position in the axial direction of the cutter 10, the same position as the first cutting position Q1 may be applied to the second cutting position Q2 in the second cutting process. Accordingly, the configuration of the gear processing machine using the skiving technology may not only be simple but also enhance the efficiency of the process. According to the configuration of the second embodiment, because the relative position of the tooth groove formed at the work 1 and the blade portion 10A of the cutter 10 is maintained, the positioning of the tooth groove formed at the work 1 and the blade portion 10A of the cutter 10 is not required.

The same as the first embodiment, in the second embodiment, the gear processing machine is controlled to set the cutting amount of the work 1 by the cutter 10 to the setting value D in the first cutting process, to start the cutting of the work 1 by synchronously rotating the work 1 and the cutter 10 in the first direction, and to continue the cutting of the work 1 by changing the cutting depth of the work 1 to the second setting value Ds which is the smaller value than the setting value D when the first cutter portion 11 reaches close to the end portion of the cutting area before reaching to the end portion of the cutting area. In the second cutting process, the cutting amount by the cutter 10 is set to the setting value D and the work 1 and the cutting of the work 1 is operated by synchronously rotating the cutter 10 and the work 1 in the second direction.

Further, the position and posture, or attitude of the switching axis Z are not limited to the second embodiment. That is, considering the position of the switching axis Z as illustrated in FIG. 2, the switching axis Z may be arranged below the cutter 10 other than being arranged above the cutter 10 as illustrated in FIG. 2. Alternatively, the posture, or attitude of the switching axis Z is not limited to the posture, or attitude orthogonal to the work axis Y. The position of the switching axis Z may be set to any degree as long as the cutter 10 moves from the first cutting position Q1 to the second cutting position Q2 when the cutter supporting member 27 rotates about the switching axis Z and the posture, or attitude of the cutter 10 is changed to cut the work 1 by the second cutter portion 12.

Figure 12:
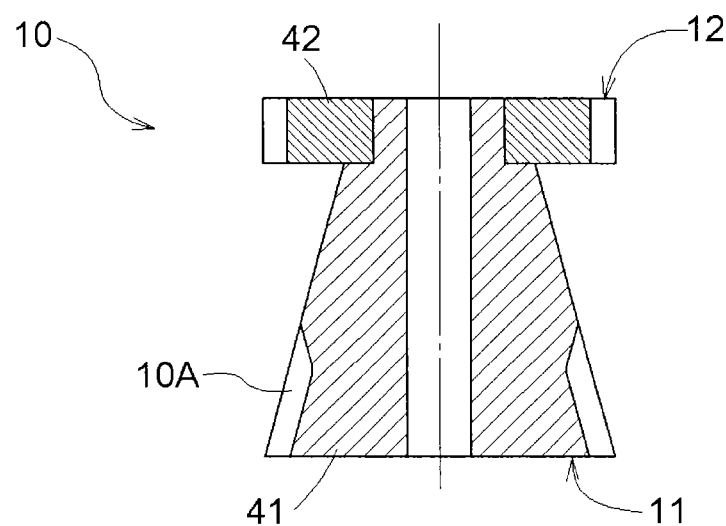
FIG. 12 is a cross-sectional view of a cutter according to a third embodiment.

According to a third embodiment of the disclosure, as illustrated in FIG. 12, the cutter 10 may be configured with a conical gear 41, a truncated conical-shaped base material whose outer circumference includes a helical-shaped groove. An edge portion of a first end of the larger diameter of the conical gear 41 includes the first cutter portion 11 while a second end of the smaller diameter of the conical gear 41 is connected and fixed to a helical gear 42 including the second cutter portion 12 which has the same shape as the first cutter portion 11.

According to the third embodiment, the cutter 10 includes two members connecting with one another. The conical gear 41 including the first cutter portion 11 is made of a higher hardness material than the helical gear 42. By selecting the material of the cutter 10, the whole body of the cutter 10 does not have to be made of the high-hardness material. Thus, the cost reduction is achieved. As a cross-sectional shape of an outer circumferential portion of the first cutter portion 11 is formed in an acute angle-shape, the apparent clearance angle α may be set large in the first cutting process.

According to the third embodiment, the cutter 10 may be formed in the same shape as the shape of the cutter 10 illustrated in FIG. 12 by cutting a single base material.

Figure 13:
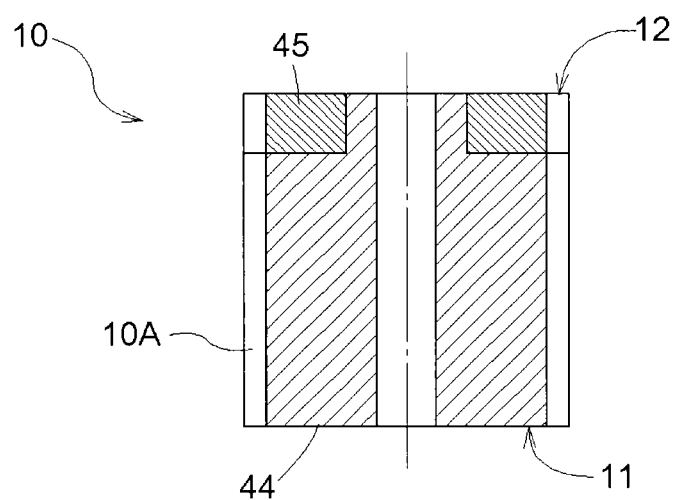
FIG. 13 is a cross-sectional view of a cutter according to a fourth embodiment.

According to a fourth embodiment of the disclosure, as illustrated in FIG. 13, the cutter 10 may include a first helical gear 44 and a second helical gear 45 connecting with one another. The cutter 10 may be in the category of the cylindrical gear. An end of the first helical gear 44 (a first end of the cutter 10) includes the first cutter portion 11 while an end of the second helical gear 45 (a second end of the cutter 10) includes the second cutter portion 12. In a case where the cutter 10 is configured by connecting the two members one another, the first helical gear 44 is made of the higher hardness material than of the second helical gear 45. By selecting the material of the cutter 10, the whole body of the cutter 10 does not have to be made of the high-hardness material. Thus, the cost reduction is achieved.

Figure 14A:
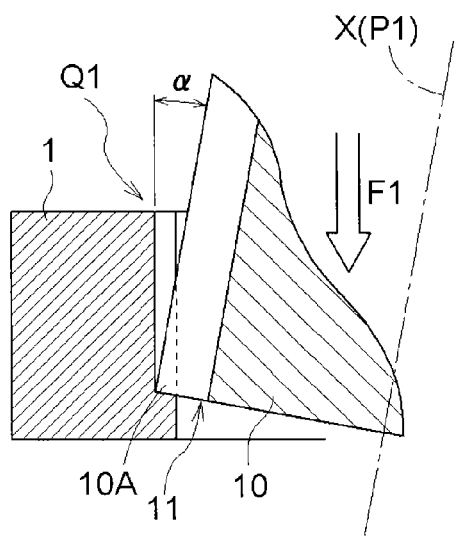
FIG. 14A is a cross-sectional view illustrating a cutting amount of a work in a first cutting process according to a fifth embodiment.
Figure 14B:
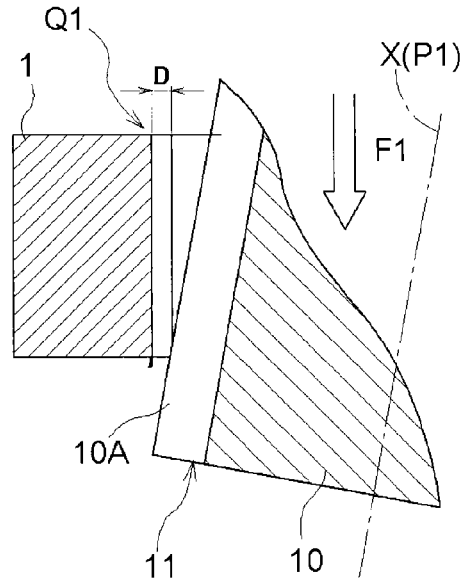
FIG. 14B is a cross-sectional view illustrating the cutting amount of the work in the first cutting process when the cutting of the work is terminated according to the fifth embodiment.
Figure 15A:
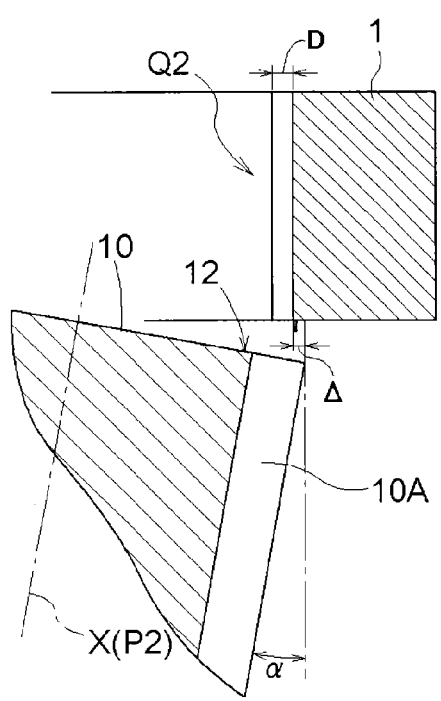
FIG. 15A is a cross-sectional view illustrating a cutting amount of the work in a second cutting process according to the fifth embodiment.

A fifth embodiment of the disclosure will be described as follows. As illustrated in FIGS. 14 and 15, in the first cutting process, the cutting depth of the work 1 is set to the setting value D and the cutting of the work 1 by the cutter 10 is operated by maintaining the setting value D until the cutter 10 reaches the end portion of the cutting area (practically, to a position exceeding the end portion of the cutting area). Next, in the second cutting process, the cutting depth of the work 1 is set to a value adding the setting amount Δ to the setting value D at the start of the cutting of the work 1. Then, the cutter 10 operates the cutting of the end portion of the work 1. That is, the cutter 10 operates the cutting of the work 1 by maintaining the setting value D in the first cutting process. In the second cutting process, the cutter 10 removes the burrs formed in the first cutting process.

Figure 15B:
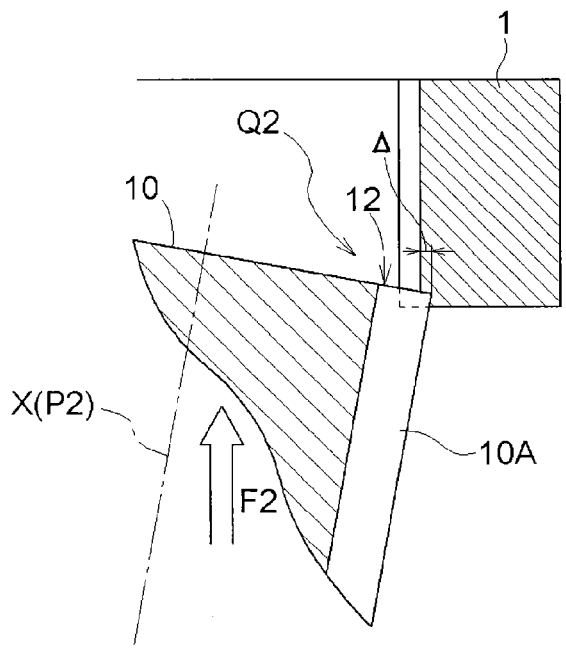
FIG. 15B is a cross-sectional view illustrating the cutting amount of the work in the second cutting process when the cutting of the work is started according to the fifth embodiment.

When the aforementioned cutting of the work 1 is operated, the same as the aforementioned embodiments, the cutting depth of the work 1 is set to the setting value D while setting the relative position of the work 1 and the cutter 10. Then, as illustrated in FIGS. 14A and 14B, the work 1 and the cutter 10 synchronously rotate one another while maintaining the aforementioned relative position and the setting value D. Under the aforementioned setting, the cutter 10 moves in the first cutting direction F1 to operate the cutting of the work 1 using the first cutter portion 11. After the first cutting process, as illustrated in FIG. 15B, the cutting depth of the work 1 is set to the value adding the setting amount Δ to the setting value D after the relative position of the work 1 and the cutter 10 is changed. Then, the work 1 and the cutter 10 synchronously rotate in the reverse direction of the rotational directions of the work 1 and the cutter 10 in the first cutting process one another. Under the aforementioned setting, the cutter 10 moves in the second cutting direction F2 by a predetermined distance to operate the cutting of the work 1 using the second cutter portion 12. In the second cutting process, as illustrated in FIG. 15B, the cutter 10 moves by the predetermined distance to remove the burrs by cutting only the end portion of the cutting area in the first process. The predetermined distance may be a distance long enough to remove the burrs.

When reducing the cutting depth of the work 1 before the cutter 10 reaches the end portion of the cutting area in the first cutting process, the cutting depth of the work 1 to be reduced may be set to an extremely small value. After reducing the cutting depth of the work 1, the control system may be set such that the cutting of the work 1 is not operated by setting a target value of the cutting depth of the work 1 to zero.

The gear processing machine using the skiving technology may include the table 2 which may be movably configured to set the relative position of the table 2 and the cutter 10. Further, the gear processing machine may be configured such that the posture, or attitude of the rotational axis of the table 2 (corresponding to the work axis Y) may be changed to set the relative angle of the cutter axis X and the work axis Y. In particular, the table 2 is configured to be moved in the cross-shaped direction and to be inclined, or tilted. Accordingly, when the cutter axis X is set relative to the work axis Y in the first cutting process, or when the posture, or attitude of the cutter axis X is changed relative to the work axis Y in the second cutting process, the table 2 moves and inclines to position the cutter 10 relative to the work 1 and to set the posture, or attitude of the cutter axis X relative to the work axis Y.

That is, even though a swing axis is required to incline the table 2, the switching axis Z and the third axis T3 of the first embodiment are not required. As a result, the gear processing machine may be configured with the three axes, that is, the work axis Y rotatably supporting the work 1, the cutter axis X rotatable supporting the cutter 10 and the axis for inclining the table 2. According to the aforementioned configuration, the gear processing machine requires the configuration in which the cutter 10 and the work 1 relatively move along the work axis Y to operate the cuttings of the work 1 in the first cutting direction F1 and the second cutting direction F2.

When the cutter 10 operates the cutting of the work 1 in the first and second processes, the cutter 10 may include teeth which may be formed by the process of crowning or relieving. By setting the form of the teeth of the work 1, the burrs may be further reduced while extending the life of the teeth formed at the work 1.

This disclosure may be applied to the method for processing the gear to cut the work 1 using the skiving technology as well as the cutter cutting the work 1 using the skiving technology. The targeted work is not limited to an inner gear. Alternatively, the disclosure may be broadly applied to the process of an object formed in a rotation symmetrical shape, the object, for example, an external gear and a spline.

According to the aforementioned embodiment, the method for processing the gear includes processes of arranging the work 1 rotatably supported about the work axis Y and the cutter 10 rotatably supported about the cutter axis X such that the work axis Y and the cutter axis X are offset from one another, synchronously rotating the work 1 and the cutter 10 at the predetermined ratio of the angular velocity, operating the first cutting process setting the cutter axis X at the first posture P1 in which the tooth trace direction of the gear-shaped first cutter portion 11 arranged at the first end of the cutter 1 is along the tooth trace direction of the work 1, setting the first cutting direction F1 in which the first cutter portion 11 is arranged at the downstream in the moving direction of the cutter 10 in the direction along the work axis Y, starting the cutting of the work 1 by moving the cutter 10 in the first cutting direction F1 while maintaining the cutting depth of the work 1 attained by the first cutter portion 11, at the setting value D, and reducing the cutting depth of the work 1 before the first cutter portion 11 reaches the end portion of the cutting area in the first cutting direction F1 in the process of the cutting of the work 1, and operating the second cutting process synchronously rotating the work 1 and the cutter 10 in the reverse direction of the rotational directions of the work 1 and the cutter 10 in the first cutting process after the first cutting process, setting the cutter axis X at the second posture P2 in which the tooth trace direction of the gear-shaped second cutter portion 12 arranged at the second end of the cutter 10 is along the tooth trace direction of the work 1, maintaining the cutting depth of the work 1, the cutting depth attained by using the second cutter portion 12, at the setting value D, and cutting the end portion of the cutting area by moving the cutter 10 in a second cutting direction F2, the reverse direction of the first cutting direction F1.

According to the aforementioned method, in the first process, the cutter 10 starts the cutting of the work 1 at the predetermined depth attained by the first cutter portion 11 using the skiving technology by synchronously rotating the work 1 and the cutter 10 and by moving the cutter 10 in the first cutting direction F1 along the tooth trace direction of the work 1. Further, the tooth groove of the end portion of the cutting area in the first cutting direction F1 becomes shallow by reducing the cutting depth before the cutter 10 reaches the end portion of the cutting area in the first cutting direction F1. The burrs are formed at the end portion of the cutting area when the cutting of the work 1 is operated in the first cutting process. Next, the tooth groove of the predetermined depth is formed at the work 1 by rotating the work 1 and the cutter 10 in the reverse direction of the rotational directions of the work 1 and the cutter 10 in the first cutting process, by exchanging the cutter axis X and by moving the cutter 10 in the second cutting direction F2 which is the reverse direction of the first cutting direction F1 while maintaining the cutting depth of the work 1 attained by the second cutter portion 12 at the setting value D. The burrs formed at the end portion of the cutting area in the first cutting direction F1 may be removed in the second cutting process. In the second cutting process, the burrs are not newly formed because the cutter 10 cuts the area where the tooth groove is already formed. Thus, the method for processing the gear preventing the burrs from being generated when the work 1 is cut by the cutter 10 using the skiving technology is reasonably configured.

According to the aforementioned embodiment, the method for processing the gear includes processes of arranging the work 1 rotatably supported about the work axis Y and the cutter 10 rotatably supported about the cutter axis X such that the work axis Y and the cutter axis X are offset from one another, synchronously rotating the work 1 and the cutter 10 at the predetermined ratio of the angular velocity, operating the first cutting process setting the cutter axis X at the first posture P1 in which the tooth trace direction of the gear-shaped first cutter portion 11 arranged at the first end of the cutter 1 is along the tooth trace direction of the work 1, setting the first cutting direction F1 in which the first cutter portion 11 is arranged at the downstream in the moving direction of the cutter 10 in the direction along the work axis Y, starting the cutting of the work 1 by moving the cutter 10 in the first cutting direction F1 while maintaining the cutting depth of the work 1, the cutting depth attained by using the first cutter portion 11, at the setting value D, and maintaining the cutting of the work 1 until the first cutter portion 11 reaches the end portion of the cutting area in the first cutting direction F1, and operating the second cutting process synchronously rotating the work 1 and the cutter 10 in the reverse direction of the rotational directions of the work 1 and the cutter 10 in the first cutting process after the first cutting process, setting the cutter axis X at the second posture P2 in which the tooth trace direction of the gear-shaped second cutter portion 12 arranged at the second end of the cutter 10 is along the tooth trace direction of the work 1, increasing the setting value D of the cutting depth of the work 1, the cutting depth attained by using the second cutter portion 12, by the setting amount Δ, and cutting the end portion of the cutting area by moving the cutter 10 in the second cutting direction F2, the reverse direction of the first cutting direction F1, by the predetermined length.

According to the aforementioned method, in the first process, the cutter 10 starts the cutting of the work 1 at the predetermined depth attained by the first cutter portion 11 using the skiving technology until the cutter 10 reaches the end portion of the cutting area in the first cutting direction F1 by synchronously rotating the work 1 and the cutter 10 and by moving the cutter 10 in the first cutting direction F1 along the tooth trace direction of the work 1. The burrs are formed at the end portion of the cutting area when the cutting of the work 1 is operated in the first cutting process. Next, the cutter 10 starts the cutting of the work 1 by moving the cutter 10 in the second cutting direction F2 which is the reverse direction of the first cutting direction F1 by rotating the work 1 and the cutter 10 in the reverse direction of the rotational directions of the work 1 and the cutter 10 in the first cutting process, by exchanging the cutter axis X and by adding the setting amount Δ to the setting value D of the cutting depth attained by the second cutter portion 12. The burrs formed at the end portion of the cutting area in the first cutting direction F1 may be removed by moving the cutter 10 in the second cutting direction F2 by the predetermined distance after the cutter 10 starts the cutting of the work 1 in the second cutting direction F2. Accordingly, the burrs are not newly formed. Thus, the method for processing the gear preventing the burrs from being generated when the work 1 is cut by the cutter 10 using the skiving technology is reasonably configured.

According to the aforementioned embodiment, the same pitch circle, the same number of the tooth and the same form of the blade are applied to the first cutter portion 11 and the second cutter portion 12.

According to the aforementioned structure, the first cutter portion 11 and the second cutter portion 12 of the cutter 10 include the same function. In the second cutting process, the cutter 10 and the work 1 rotate in the reverse direction of the rotational directions of the work 1 and the cutter 10 in the first cutting process. However, each absolute value of the rotational speed of the cutter 10 and the work 1 may be the same as the rotational speed of the cutter 10 and the work 1 in the first cutting process and thus, a transmission mechanism driving the cutter 10 and the work 1 may be simply configured.

According to the aforementioned embodiment, the cutter supporting member 27 rotatably supporting the cutter 10 is swingably supported about the single switching axis Z and the first cutter portion 11 is switched between the first posture P1 and the second posture P2 by swinging the cutter supporting member 27 about the switching axis Z.

According to the aforementioned structure, in a transition from the first cutting process to the second cutting process, the posture, or attitude of the cutter supporting member 27 only has to be switched from the first position (P1) to the second position (P2) by swinging the cutter supporting member 27 about the switching axis Z. That is, for example, the gear processing machine may be configured either to swing the cutter supporting member 27 about the plural swinging axes or to combine the shift operation with the swinging movement of the cutter supporting member 27. Accordingly, the number of the components may be reduced. The switching of the cutter supporting member 27 may be promptly operated.

According to the aforementioned embodiment, the cutter 10 for gear processing includes the first cutter portion 11 formed in the gear shape and arranged at the first end of the cutter 10, and the second cutter portion 12 formed in the gear shape and arranged at the second end of the cutter 10, in which the cutter 10 is rotatable about the cutter axis X and the same pitch circle, the same number of the tooth and the same form of the blade are applied to the first cutter portion 11 and the second cutter portion 12.

According to the aforementioned structure, when the work 1 is cut by the cutter 10 of the disclosure, the cutting of the work 1 using the skiving technology is operated by synchronously rotating the cutter 10 and the work 1, contacting the work 1 with either the first cutter portion 11 or the second cutter portion 12, the cutter portion close to a downstream in the moving direction at the time of cutting, and shifting the cutter 10 in the predetermined direction along the tooth trace direction of the work 1. After the cutting of the work 1, the cutting of the work 1 using the skiving technology, the technology achieved by shifting the cutter 10 in the reverse direction of the aforementioned predetermined direction, is operated by shifting the cutter axis X, by rotating the work 1 and the cutter 10 of the disclosure in the reverse direction of the previous cutting of the work 1, and by contacting either the first cutter portion 11 or the second cutter portion 12, the cutter portion not being used in the previous cutting (up-stream in the moving direction) to the work 1. Because the first cutter portion 11 and the second cutter portion 12 of the cutter 10 of the disclosure are equally configured, either the first cutter portion 11 or the second cutter portion 12 may form the same tooth surface relative to the work 1. When the cutter 10 of the disclosure operates the cutting of the work 1, the cutting depth of the end portion of the cutting area cut in the previous cutting is set to be shallow. Then, the end portion of the cutting area is cut in the reverse direction of the direction in the previous cutting process so that the cutting of the gear with the desired tooth surface may be operated. Accordingly, the burrs formed at the work 1 in the previous cutting may be removed in the next cutting. Thus, the cutter 10 for gear processing preventing the burrs from being generated when the work 1 is cut by the cutter 10 using the skiving technology is configured.

According to the aforementioned embodiment, the first cutter portion ills made of the higher hardness material than the second cutter portion 12.

According to the aforementioned structure, when the cutter 10 forms the tooth surface on the work 1, the cutting system may be set such that a major portion of the cutting area is cut by the first cutter portion 11 while applying the second cutter portion 12 to remove the burrs. Thus, the hardness of the second cutter portion 12 does not have to be the same as the first cutter portion 11, resulting in that the cost of the cutter 10 may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for processing a gear, comprising processes of:
arranging a work rotatably supported about a work axis and a cutter rotatably supported about a cutter axis such that the work axis and the cutter axis are offset from one another;
synchronously rotating the work and the cutter at a predetermined ratio of an angular velocity;
operating a first cutting process setting the cutter axis at a first posture wherein a tooth trace direction of a gear-shaped first cutter portion arranged at a first end of the cutter is along a tooth trace direction of the work, setting a first cutting direction wherein the first cutter portion is arranged at a downstream in a moving direction of the cutter in a direction along the work axis, starting the cutting of the work by moving the cutter in the first cutting direction while maintaining a cutting depth of the work, the cutting depth attained by using the first cutter portion, at a setting value, and reducing the cutting depth of the work before the first cutter portion reaches an end portion of a cutting area in the first cutting direction in the process of the cutting of the work; and operating a second cutting process synchronously rotating the work and the cutter in a reverse direction of rotational directions of the work and the cutter in the first cutting process after the first cutting process, setting the cutter axis at a second posture wherein the tooth trace direction of a gear-shaped second cutter portion arranged at a second end of the cutter is along the tooth trace direction of the work, maintaining the cutting depth of the work, the cutting depth attained by using the second cutter portion, at the setting value, and cutting the end portion of the cutting area by moving the cutter in a second cutting direction, a reverse direction of the first cutting direction.

2. A method for processing a gear, comprising processes of:

arranging a work rotatably supported about a work axis and a cutter rotatably supported about a cutter axis such that the work axis and the cutter axis are offset from one another;

synchronously rotating the work and the cutter at a predetermined ratio of an angular velocity;

operating a first cutting process setting the cutter axis at a first posture wherein a tooth trace direction of a gear-shaped first cutter portion arranged at a first end of the cutter is along a tooth trace direction of the work, setting a first cutting direction wherein the first cutter portion is arranged at a downstream in a moving direction of the cutter in a direction along the work axis, starting the cutting of the work by moving the cutter in the first cutting direction while maintaining a cutting depth of the work, the cutting depth attained by using the first cutter portion, at a setting value, and maintaining the cutting of the work until the first cutter portion reaches an end portion of a cutting area in the first cutting direction; and operating a second cutting process synchronously rotating the work and the cutter in a reverse direction of rotational directions of the work and the cutter in the first cutting process after the first cutting process, setting the cutter axis at a second posture wherein the tooth trace direction of a gear-shaped second cutter portion arranged at a second end of the cutter is along the tooth trace direction of the work, increasing the setting value of the cutting depth of the work, the cutting depth attained by using the second cutter portion, by a setting amount, and cutting the end portion of the cutting area by moving the cutter in a second cutting direction, a reverse direction of the first cutting direction, by a predetermined length.

3. The method for processing the gear according to claim 1, wherein a same pitch circle, a same number of a tooth and a same form of a blade are applied to the first cutter portion and the second cutter portion.

4. The method for processing the gear according to claim 1, wherein a cutter supporting member rotatably supporting the cutter is swingably supported about a single switching axis and the first cutter portion is switched between the first posture and the second posture by swinging the cutter supporting member about the switching axis.

5. The method for processing the gear according to claim 3, wherein a cutter supporting member rotatably supporting the cutter is swingably supported about a single switching axis and the first cutter portion is switched between the first posture and the second posture by swinging the cutter supporting member about the switching axis.

6. The method for processing the gear according to claim 2, wherein a same pitch circle, a same number of a tooth and a same form of a blade are applied to the first cutter portion and the second cutter portion.

7. The method for processing the gear according to claim 2, wherein a cutter supporting member rotatably supporting the cutter is swingably supported about a single switching axis and the first cutter portion is switched between the first posture and the second posture by swinging the cutter supporting member about the switching axis.

8. The method for processing the gear according to claim 6, wherein a cutter supporting member rotatably supporting the cutter is swingably supported about a single switching axis and the first cutter portion is switched between the first posture and the second posture by swinging the cutter supporting member about the switching axis.

9. The method for processing the gear according to claim 1, wherein a first relative position of the work and the cutter is set at the first cutting position in the first cutting process, a second relative position of the work and the cutter is set at the second cutting position in the second cutting process, in a plan view illustrating the first and second relative positions of the first cutting position and the second cutting position, a straight line passing through the work axis is defined as a base line, a line connecting the work axis and the first cutting position is defined as a first virtual line, and a line connecting the work axis and the second cutting position is defined as a second virtual line, the first virtual line and the base line intersect to define a first cross angle, at an opposite side across the work axis, the second virtual line and the base line intersect to define a second cross angle, the an intersection point of the virtual line and the inner circumference of the work defines the second cutting position, the relative positions of the first cutting position and the second cutting position are described such that the first cutting position and the second cutting position are positioned opposite across the work axis and the respective cross angles of the respective virtual lines and the respective base lines have the same degree.

10. The method for processing the gear according to claim 1, wherein the work is cut and processed to form a spur inner gear including plural teeth whose tooth trace direction is arranged in parallel with the work axis.

11. The method for processing the gear according to claim 2, wherein a first relative position of the work and the cutter is set at the first cutting position in the first cutting process, a second relative position of the work and the cutter is set at the second cutting position in the second cutting process, in a plan view illustrating the first and second relative positions of the first cutting position and the second cutting position, a straight line passing through the work axis is defined as a base line, a line connecting the work axis and the first cutting position is defined as a first virtual line, and a line connecting the work axis and the second cutting position is defined as a second virtual line, the first virtual line and the base line intersect to define a first cross angle, at an opposite side across the work axis, the second virtual line and the base line intersect to define a second cross angle, the an intersection point of the virtual line and the inner circumference of the work defines the second cutting position, the relative positions of the first cutting position and the second cutting position are described such that the first cutting position and the second cutting position are positioned opposite across the work axis and the respective cross angles of the respective virtual lines and the respective base lines have the same degree.

12. The method for processing the gear according to claim 2, wherein the work is cut and processed to from a spur inner gear including plural teeth whose tooth trace direction is arranged in parallel with the work axis.

\* \* \* \* \*